United States Patent
Sekine et al.

(10) Patent No.: US 6,853,760 B2
(45) Date of Patent: Feb. 8, 2005

(54) OPTICAL FUNCTIONAL DEVICE AND OPTICAL INTEGRATED DEVICE

(75) Inventors: Koujirou Sekine, Ibaraki (JP); Mitsuru Yokoyama, Takatsuki (JP); Miyuki Teramoto, Osakasayama (JP); Kyu Takada, Otsu (JP); Takuji Hatano, Suita (JP); Shinji Maruyama, Sapporo (JP); Tsuyoshi Iwamoto, Nishinomiya (JP)

(73) Assignee: Minolta Co., Ltd., Osaka (JP)

( * ) Notice: Subject to any disclaimer, the term of this patent is extended or adjusted under 35 U.S.C. 154(b) by 119 days.

(21) Appl. No.: 09/765,229

(22) Filed: Jan. 18, 2001

(65) Prior Publication Data

US 2001/0026659 A1 Oct. 4, 2001

(30) Foreign Application Priority Data

Jan. 24, 2000 (JP) ........................................ 2000-017911
Jul. 12, 2000 (JP) ........................................ 2000-210988

(51) Int. Cl.[7] .............................. G02B 6/12; G02B 6/36
(52) U.S. Cl. ............................................. 385/14; 385/39
(58) Field of Search ............................. 385/14, 39, 40, 385/37, 7; 359/573; 349/202

(56) References Cited

U.S. PATENT DOCUMENTS

| 3,843,231 | A | * | 10/1974 | Borel et al. |  |
|---|---|---|---|---|---|
| 3,970,959 | A | * | 7/1976 | Wang et al. |  |
| 4,039,249 | A | * | 8/1977 | Kaminow et al. |  |
| 4,286,232 | A | * | 8/1981 | Puech et al. |  |
| 4,743,087 | A | * | 5/1988 | Utaka et al. |  |
| 4,850,682 | A | * | 7/1989 | Gerritsen | 349/201 |
| 4,900,113 | A | * | 2/1990 | Hatori | 385/7 |
| 5,115,344 | A | * | 5/1992 | Jaskie | 359/573 |
| 5,299,037 | A | * | 3/1994 | Sakata | 349/1 |
| 5,335,240 | A |   | 8/1994 | Ho et al. | 372/39 |
| 5,406,573 | A |   | 4/1995 | Ozbay et al. | 372/43 |
| 5,488,681 | A | * | 1/1996 | Deacon et al. | 385/37 |
| 5,526,449 | A |   | 6/1996 | Meade et al. | 385/14 |
| 5,647,039 | A | * | 7/1997 | Judkins et al. | 385/37 |

(List continued on next page.)

OTHER PUBLICATIONS

"Guided–Wave Acoustooptic Bragg Modulators for Wide-Band Integrated Optic Communications and Signal Processing", Chen S. Tsai, *IEEE Transactions on Circuits and Systems*, vol. CAS–26, No. 12, Dec. 1979, pp. 1072–1098.
"Inhibited Spontaneous Emission in Solid–State Physics and Electronics", Eli Yablonovitch, *Physical Review Letters*, vol. 58, No. 20, May 18, 1987, pp. 2059–2062.
"Existence of a Photonic Gap in Periodic Dielectric Structures", K.M. Ho, C.T. Chan, and C.M. Soukoulis, *Physical Review Letters*, vol. 65, No. 25, Dec. 17, 1990, pp. 3152–3155.

*Primary Examiner*—Rodney Bovernick
*Assistant Examiner*—Mike Stahl
(74) *Attorney, Agent, or Firm*—Sidley Austin Brown & Wood LLP

(57) ABSTRACT

On a waveguide 34 formed on a substrate 33, a plurality of comblike shaped electrodes 37, 38 that generate surface acoustic waves 37a, 38a from different directions are provided. And a periodic refractive indices portion 40 is formed, where the refractive indices are periodically distributed in accordance with the wavelengths of the surface acoustic waves 37a, 38a generated by applying a voltage to the comblike shaped electrodes 37, 38. And by changing a frequency of the applying voltage for sequentially changing the wavelengths of the surface acoustic waves 37a, 38a, the exiting direction of the light exiting from the periodic refractive indices portion 40 is scanned. This makes it possible to provide an optical functional device and an optical scanning apparatus that perform light scanning less costly but at a high speed, and that can secure a wide scanning angle.

30 Claims, 15 Drawing Sheets

U.S. PATENT DOCUMENTS

| | | |
|---|---|---|
| 5,739,796 A | 4/1998 | Jasper, Jr. et al. ........... 343/895 |
| 5,740,287 A | 4/1998 | Scalora et al. ................. 385/6 |
| 5,781,677 A * | 7/1998 | Jin et al. ....................... 385/37 |
| 5,784,400 A | 7/1998 | Joannopoulos et al. ....... 372/96 |
| 5,973,823 A | 10/1999 | Koops et al. ................ 359/322 |
| 5,987,208 A | 11/1999 | Grüning et al. ............. 385/146 |
| 5,990,850 A | 11/1999 | Brown et al. ................ 343/912 |
| 5,998,298 A | 12/1999 | Fleming et al. ............. 438/692 |
| 5,999,308 A | 12/1999 | Nelson et al. ............... 359/321 |
| 6,002,522 A | 12/1999 | Todori et al. ................ 359/573 |
| 6,028,693 A | 2/2000 | Fork et al. ................... 359/248 |
| 6,058,127 A | 5/2000 | Joannopoulos et al. ....... 372/92 |
| 6,064,506 A | 5/2000 | Koops ......................... 359/237 |
| 6,075,915 A | 6/2000 | Koops et al. ................ 385/125 |
| 6,175,671 B1 * | 1/2001 | Roberts ........................ 385/14 |
| 6,278,105 B1 * | 8/2001 | Mattia ...................... 250/214.1 |
| 6,310,991 B1 * | 10/2001 | Koops et al. .................. 385/14 |

* cited by examiner

OPTICAL FUNCTIONAL DEVICE AND OPTICAL INTEGRATED DEVICE

This application is based on applications Nos. H2000-17911 and H2000-210988 filed in Japan, the contents of which are hereby incorporated by reference.

BACKGROUND OF THE INVENTION

1. Field of the Invention

The present invention relates to an optical functional device and to an optical integrated device that have a periodic structure with refractive indices varying in recurring periodic patterns, and that can such as multiplex and demultiplex optical signals.

2. Description of the Prior Art

The structure of an optical functional device having a periodic structure composed of media of different refractive indices is shown in FIG. 1. The optical functional device 1 is so constructed that, in a medium 3, cylindrical media 2 are arranged in a predetermined two-dimensional periodic pattern. For example, by forming holes in a silicon substrate (hereinafter, referred to as a Si substrate) in predetermined recurring periodic patterns, the media 2, 3 can form the optical functional device 1 composed of the media having different refractive indices, namely air and silicon.

The thus obtained optical functional device 1 is generally called as a photonic crystal, and by properly selecting the refractive indices of the media 2, 3, the shapes of the media 2, 3 such as cylindrical or prismatic, the types of the lattice such as a trigonal lattice or a tetragonal lattice, or the periodicity in arranging the media 2, 3, it is possible to obtain different optical properties corresponding to light having particular wavelengths or polarization directions.

FIG. 2 shows a conventional optical integrated device 10 provided with the optical functional device 1. On a substrate 8, the optical functional device 1 is arranged, and waveguides 4, 5, 6 are formed for guiding light entering the optical functional device 1 and light exiting from the optical functional device 1. When, via an input terminal 4a of the waveguide 4, light consisting of components having wavelengths of λ1 and λ2 is inputted, the light enters the optical functional device 1 through the waveguide 4. From the optical functional device 1, the light components are outputted in the different directions in accordance with their wavelengths, and via terminals 5a, 6a of the waveguides 5, 6, the light components having wavelengths of λ1 and λ2 are outputted, respectively.

Therefore, it is possible to use the optical integrated device 10 as a demultiplexer for demultiplexing optical signals of multiplex light having different wavelengths, and as a multiplexer for multiplexing light having different wavelengths by reversing the direction in which light travels. By making transmittance for light having a predetermined wavelength higher and transmittance for light having other wavelengths lower, it is also possible to use the optical integrated device 10 as a filter for transmitting light having a specific wavelength. Furthermore, when the light entering the optical functional device 1 contains TE-polarized and TM-polarized light that has different polarization directions, it is also possible to output the light components in the different directions or intercept them according to their polarization directions.

A conventional laser beam printer and copying machine can perform printing in the cross direction of paper, with using a rotatable polygon mirror, by scanning the light reflected on the surrounding surfaces of the polygon mirror. However, the polygon mirror is required to perform with high accuracy, and this makes it costly. In addition, there is a limitation to accelerate the rotation speed thereof, and this causes a problem in accelerating the printing speed.

Therefore, C. S. Tsai, *IEEE Trans. Circuits and Systems*, vol. CAS-26, no. 12, 1979 discloses an optical scanning apparatus in which an optical functional device using a waveguide having a diffraction grating is provided for scanning light by varying the exiting directions in accordance with the wavelengths of incident light.

However, in the conventional optical functional device 1 and the optical integrated device 10 described earlier, the refractive indices and the shapes of media 2, 3, the types of lattice, or the periodic pattern thereof are selected according to light having a predetermined wavelength or polarization direction. Therefore, if the light to be used have wavelengths or polarization directions different from those of other light to be used, it requires separate designing and manufacturing processes, and this makes the optical functional device 1 and the optical integrated device 10 costly. Furthermore, the conventional optical functional device 1 and the optical integrated device 10 can be used as a multiplexer, a demultiplexer, and the like; however, they do not possess a function as a switching device that transmits specific light at a predetermined period and that intercepts the light at a predetermined period.

In addition, in respect to the optical scanning apparatus having the conventional diffraction grating mentioned above, the diffraction grating exhibits a small range of refractive index distribution, and this causes a problem of a small scanning angle. Furthermore, because of the difficulty in securing enough light amount of the light dispersed by the diffraction grating, it is difficult to put this optical scanning apparatus into practical use.

SUMMARY OF THE INVENTION

An object of the present invention is to provide an optical functional device and an optical integrated device that can achieve cost reduction and that can function as a switching device.

Another object of the present invention is to provide an optical functional device and an optical integrated device that scan exiting light less costly but at a high speed, and that can secure a wide scanning angle.

To achieve the above object, according to one aspect of the present invention, an optical functional device has a periodic structure with refractive indices varying in recurring periodic patterns, wherein the periodic structure is variable.

The periodic structure includes a medium having an electro-optical effect, and by electrically controlling the medium from outside, the periodic structure can be varied.

The periodic structure is formed by the elastic waves propagating in one or more media, and the periodic structure is varied by electrically controlling the frequency of the elastic waves from outside.

According to another aspect of the present invention, an optical integrated device is provided with a waveguide portion for guiding light; and a periodic structure portion to which light is directed by the waveguide portion, and which has a periodic structure with refractive indices varying in recurring periodic patterns, wherein the periodic structure is variable.

An optical integrated device is further provided with a voltage applying portion for applying a voltage to the periodic structure portion for varying the periodic structure.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 2:
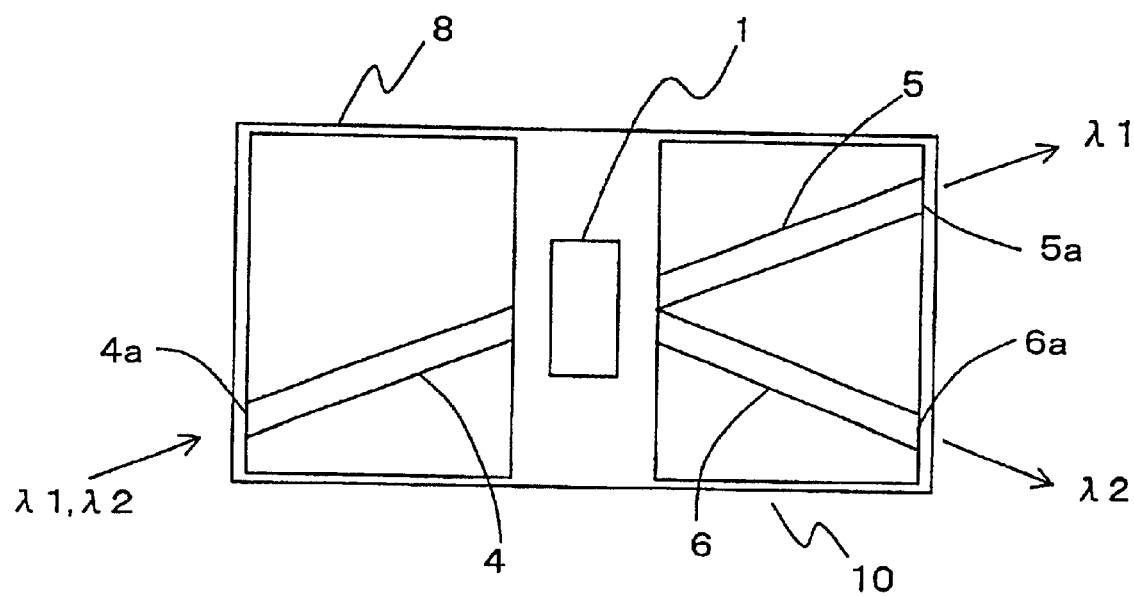
FIG. 2 is a plan view showing a conventional optical integrated device.
Figure 3:
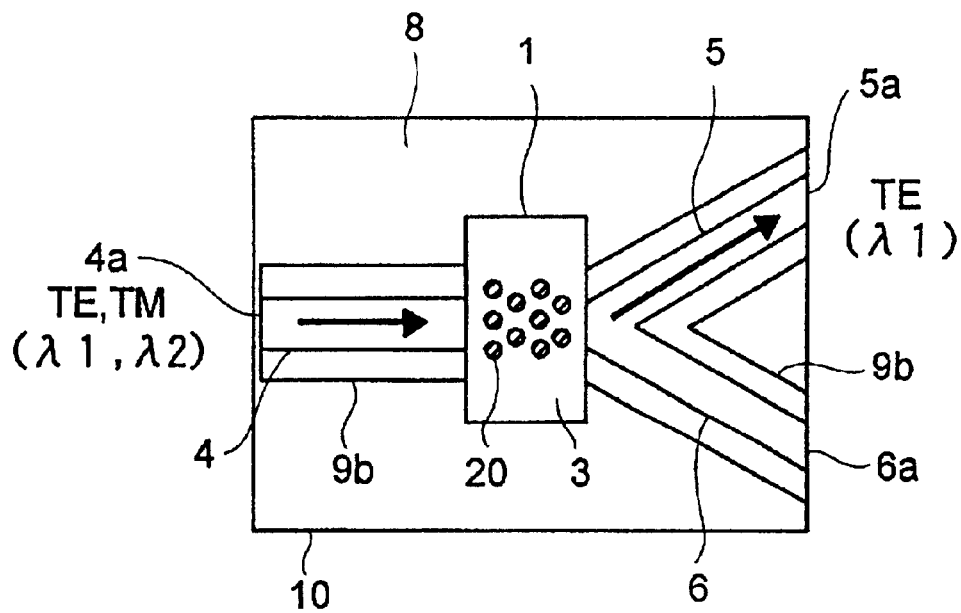
FIG. 3 is a plan view showing an optical integrated device of a first embodiment of the present invention.

Hereinafter, embodiments of the present invention will be described with reference to the drawings. For the sake of convenience, in the following description, such elements as serving the same or corresponding functions as in the conventional example (FIG. 2) are identified with the same reference symbols. FIG. 3 is a plan view showing an optical integrated device of a first embodiment of the present invention. In the optical integrated device 10, an optical functional device 1 is arranged on the substrate 8 formed of Si or the like.

On the both sides of the optical functional device 1, waveguides 4, 5, 6 are arranged. The waveguides 4, 5, 6 are obtained by forming a thin film of alumina or the like and etching the thin film that has been patterned into a desired shape. The waveguides 4, 5, 6 are covered both on top and right below thereof with a lower cladding 9a (not shown) and an upper cladding 9b. The lower cladding 9a and the upper cladding 9b are obtained by depositing alumina, glass, or the like which has a refractive index different from that of the waveguides 4, 5, 6. In this structure, the waveguides 4, 5, 6 guide the light entering from an input terminal 4a or the light exiting from the optical functional device 1 without letting the light out from the waveguides, and efficiently direct the light to the exiting terminals 5a, 6a.

Figure 1:
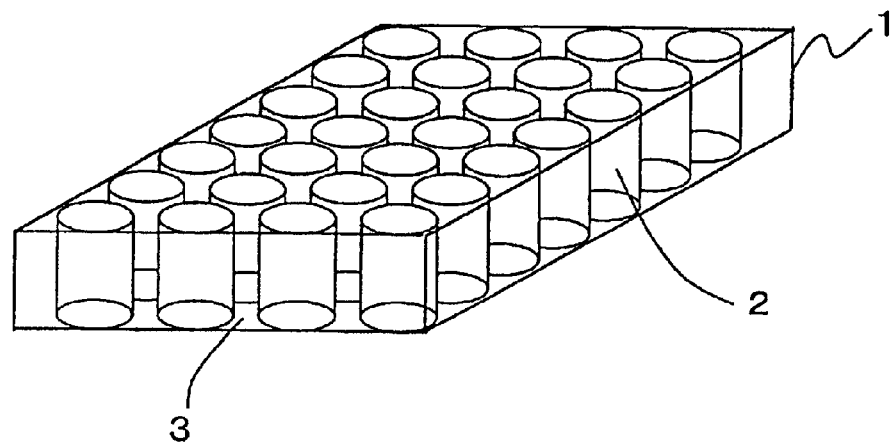
FIG. 1 is a perspective view showing the construction of an optical functional device.

The optical functional device 1 is so formed as to have the construction similar to that shown in FIG. 1 described earlier, that is, in a medium 3 made of Si or the like, media 20 made of liquid crystal are arranged in a two-dimensional periodic pattern. Thus, a photonic crystal having a periodic structure composed of media of different refractive indices is formed. The media 20 having cylindrical shape are obtained by forming holes on the Si substrate in a predetermined periodic pattern by dry etching or the like, and then filling liquid crystal in the holes.

If the light composed of TE-polarized and TM-polarized light having different polarization directions is inputted from the input terminal 4a of the waveguide 4, the light passes through the waveguide 4, and then enters the optical functional device 1. The optical functional device 1 is so designed as to have the optical properties that transmit TE-polarized light in a predetermined direction, and that do not transmit TM-polarized light.

Figure 5:
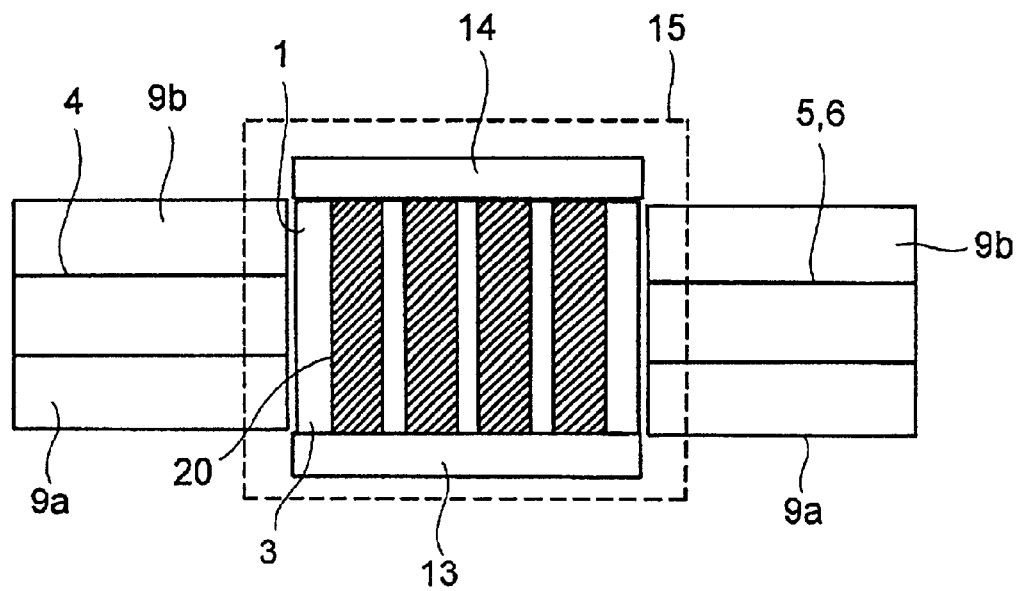
FIG. 5 is a sectional view showing the optical integrated device of the first embodiment.
Figure 6:
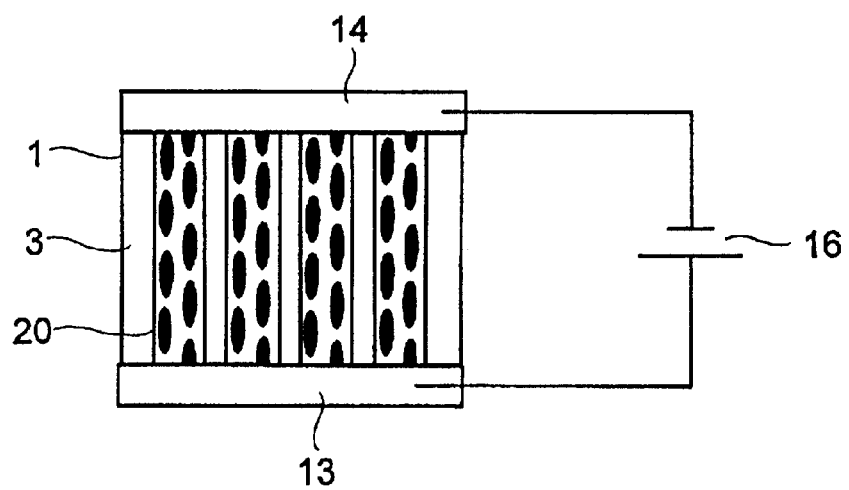
FIG. 6 is a sectional view showing the optical functional device disposed on the optical integrated device of the first embodiment.

Therefore, TE-polarized light passes through the waveguide 5 and is outputted from the output terminal 5a, and TM-polarized light is intercepted. The sectional view of the optical integrated device 10 is shown in FIG. 5. In this figure, on top and right below of the optical functional device 1, electrodes 13, 14 are so attached as to form an integral unit. And as shown in FIG. 6, to the electrodes 13, 14, a power supply 16 is connected. Thus, the optical integrated device 15 is formed.

When a voltage is applied to the media 20 made of liquid crystal, the refractive index is changed as a result of the electro-optical effect. Thereby, the periodic structure of the optical functional device 1 is varied. Therefore, when a voltage is applied between the electrodes 13, 14 by the power supply 16, the optical properties of the optical functional device 1 change so as to transmit TM-polarized light.

Figure 4:
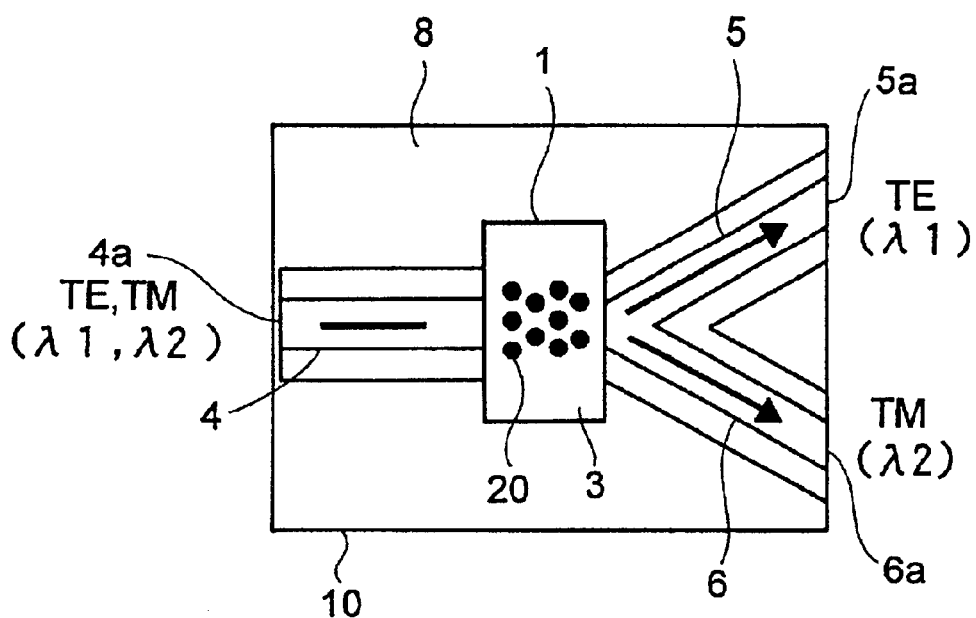
FIG. 4 is a plan view showing an optical functional device disposed on the optical integrated device of the first embodiment while a voltage is applied thereto.

Therefore, as shown in FIG. 4, when the light composed of TE-polarized and TM-polarized light is inputted from the input terminal 4a, the light enters the optical functional device 1 through the waveguide 4, and then is separated. Then, TE-polarized light having passed through the waveguide 5 is outputted from the output terminal 5a, and TM-polarized light having passed through the waveguide 6 is outputted from the output terminal 6a.

Therefore, the optical integrated device 10 can be used as a demultiplexer that performs demultiplexing to separate light into TE-polarized and TM-polarized light, and also as a filter that transmits TE-polarized light and intercepts TM-polarized light. Furthermore, the optical integrated device 10 can be used as a switching device that intercepts TM-polarized light while a voltage is not applied between the electrodes 13, 14, and by applying a voltage between the electrodes 13, 14, that transmits and extracts TM-polarized light. In addition, by varying the voltage applied between the electrodes 13, 14 so as to change the travelling direction of TE-polarized or TM-polarized light, it is possible to output TE-polarized or TM-polarized light from the separately arranged waveguide.

In this embodiment, as the media 20, liquid crystal is used for, through the electro-optical effect, varying the optical properties of the optical functional device 1 corresponding to the polarization direction of incident light. On the other hand, it is also possible to use a material having the electro-optical effect that changes the refractive index of the media 20 so as to vary the periodic structure of the optical functional device 1 and to vary the optical properties of the optical functional device 1 corresponding to the wavelength of incident light.

That is, as shown in FIG. 3 previously described, while a voltage is not applied between the electrodes 13, 14, if multiplex light consisting of components having different wavelengths of $\lambda 1$ and $\lambda 2$ is entered from the input terminal 4a of the waveguide 4, the light enters the optical functional device 1 through the waveguide 4. The optical functional device 1 transmits the light component having a wavelength of $\lambda 1$ in a predetermined direction, and intercepts the light component having a wavelength of $\lambda 2$. (in the figure, shown in parentheses).

When a voltage is applied between the electrodes 13, 14, as shown in FIG. 4 previously described, if light consisting of components having wavelengths of $\lambda 1$ and $\lambda 2$ is inputted from the input terminal 4a, the light enters the optical functional device 1 through the waveguide 4, and then is separated. Thereafter, the light component having a wavelength of $\lambda 1$ passes through the waveguide 5 and then is outputted from the output terminal 5a, and the light component having a wavelength of $\lambda 2$ passes through the waveguide 6 and then is outputted from the output terminal 6a. (in the figure, shown in parentheses).

Therefore, the optical integrated device 10 can be used as a demultiplexer that performs demultiplexing to separate light having different wavelengths, and it can be used also as a filter that transmits the light component having a wavelength of $\lambda 1$ and intercepts the light component having a wavelength of $\lambda 2$. In addition, the optical integrated device 10 can be used as a switching device that can extract the light component having a wavelength of $\lambda 2$ by applying a voltage at a predetermined period. Furthermore, a similar result can be obtained by varying the optical properties of the optical functional device 1 while changing the applying voltage.

Here, as a material having the electro-optical effect other than liquid crystal, $LiNbO_3$, PLZT, or the like can be used. With using these materials as the media 20, the refractive index of the media 20 can be varied and the periodic structure thereof also can be varied; therefore, it is possible to obtain an optical functional device having various optical properties that correspond to different polarization directions and wavelengths.

Here, liquid crystal has a long and narrow molecular structure, and therefore it has a property that makes the refractive indices of the optical functional device 1 so changed as to remarkably increase its anisotropy. Because of this property, as in this embodiment, when liquid crystal is used as the media 20, it is possible to remarkably change the properties of the optical functional device 1 those of which correspond to TE-polarized and TM-polarized light. Therefore, it is possible to switch readily between intercepting and transmitting specific light that is either TE-polarized or TM-polarized light, and this makes the liquid crystal desirable to be used as the media 20.

Figure 7:
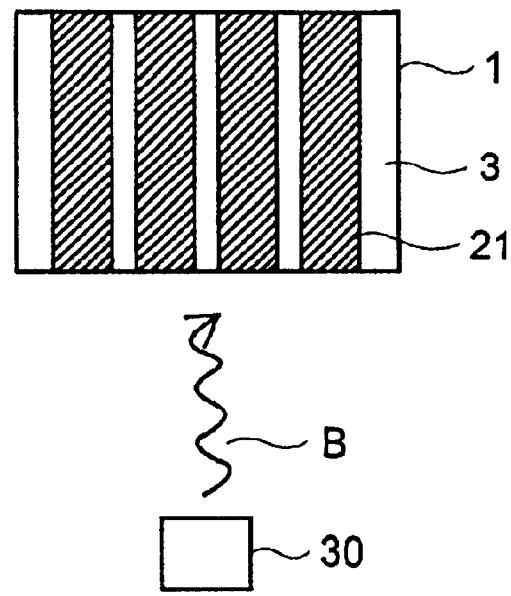
FIG. 7 is a sectional view of an optical functional device disposed on an optical integrated device of a second embodiment of the present invention.

FIG. 7 is a diagram illustrating an optical functional device on an optical integrated device of a second embodiment of the invention. The optical integrated device 10 of this embodiment has the construction similar to that of the first embodiment shown in FIGS. 1 to 5 described previously, and media 21 arranged in a medium 3 of an optical functional device 1 in a two-dimensional predetermined periodic pattern is made of a material such as glass which has the thermal-optical effect that changes the refractive index by heat. The electrodes 13, 14 (see FIG. 5) that are provided in the first embodiment are not provided here, and a coil 30 is arranged near the optical functional device 1.

In this construction, when an electric current is applied to the coil 30, radiant heat irradiates the optical functional device 1 as indicated by arrow B. Then, the refractive index of the media 21 changes, and the periodic pattern of the optical functional device is varied. Therefore, similar to the first embodiment, by applying an electric current to the coil 30 or shutting it off, it is possible to vary the optical properties of the optical functional device 1.

As shown in FIGS. 3 and 4 previously described, while an electric current is not applied to the coil 30, if multiplex light having two different wavelengths or polarization directions is inputted from the input terminal 4a of the waveguide 4, the light enters the optical functional device 1 through the waveguide 4. The optical functional device 1 transmits light having a specific wavelength or polarization direction in a predetermined direction. And the light having another wavelength or polarization direction also passes through the optical functional device 1.

When an electric current is applied to the coil 30, the light having two different wavelengths or polarization directions being inputted from the input terminal 4a enters the optical functional device 1 through the waveguide 4, and then is separated. Thereafter, light having a specific wavelength or polarization direction passes through the waveguide 5 and then is outputted from the output terminal 5a. And light having another wavelength or polarization direction passes through the waveguide 6, and then is outputted from the output terminal 6a.

Therefore, the optical integrated device 10 can be used as a demultiplexer that performs demultiplexing to separate light having different wavelengths or polarization directions, and it can be used also as a filter that intercepts light having a specific wavelength or polarization direction. In addition, the optical integrated device 10 can be used as a switching device that can extract light having a specific wavelength or polarization direction by applying an electric current to the coil 30 at a predetermined period.

Here, if a material having the magneto-optical effect such as YIG ($Y_3Fe_5O_3$) in which the refractive index is changed by the magnetic field developed by the coil 30 is used as the media 21, it is also possible to obtain a similar result.

Figure 8:
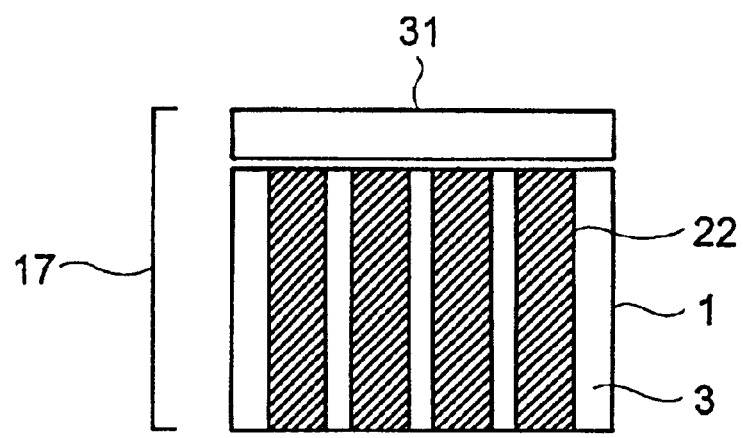
FIG. 8 is a sectional view of an optical functional device disposed on an optical integrated device of a third embodiment of the present invention.

FIG. 8 is a diagram illustrating an optical functional device on an optical integrated device of a third embodiment of the invention. The optical integrated device 10 of this embodiment has the construction similar to that of the first embodiment shown in FIGS. 1 to 5 described previously.

Here, media 22 disposed in a medium 3 of an optical functional device 1 with being arranged in a two-dimensional predetermined periodic pattern is made of a material such as glass or GaP which has the acoustooptic effect that changes the refractive index by acoustic waves. This construction does not include the electrodes 13, 14 (see FIG. 5) that are provided in the first embodiment.

On one side of the optical functional device 1, an acoustic wave generator 31 is so attached as to form an integral unit. Thus, an optical integrated device 17 is formed. When the acoustic wave generator 31 is driven, acoustic waves are generated in the optical functional device 1. Owing to this acoustic waves, the refractive index of the media 22 is changed, and therefore the periodic structure of the optical functional device 1 is varied. Therefore, as in the first and second embodiments, it is possible to vary the optical properties of the optical functional device 1 by driving and stopping the acoustic wave generator 31.

As shown in FIGS. 3 and 4 previously described, while the acoustic wave generator 31 is in a stop status, if multiplex light having two different wavelengths or polarization directions is inputted from the input terminal 4a, the light enters the optical functional device 1 through the waveguide 4. The optical functional device 1 transmits light having a specific wavelength or polarization direction in a predetermined direction, and also transmits light having another wavelength or polarization direction.

When the acoustic wave generator 31 is driven, light having two different wavelengths or polarization directions being inputted from the input terminal 4a enters the optical functional device 1 through the waveguide 4, and then is separated. Thereafter, light having a specific wavelength or polarization direction passes through the waveguide 5, and then is outputted from the output terminal 5a. And light having another wavelength or polarization direction passes through the waveguide 6 and then is outputted from the output terminal 6a.

Therefore, the optical integrated device 10 can be used as a demultiplexer that performs demultiplexing to separate light having different wavelengths or polarization directions, and it can be used also as a filter that intercepts light having a specific wavelength or polarization direction. In addition, the optical integrated device 10 can be used as a switching device that can extract light having a specific wavelength or polarization direction by driving the acoustic wave generator 31 at a predetermined period.

Here, if a material such as $BeTiO_3$ in which the refractive index is changed by the sound pressure of the acoustic waves generated by the acoustic wave generator 31 is used as the media 22, it is also possible to obtain a similar result.

In the first to third embodiments, a case in which the optical functional device 1 has the two-dimensional periodic structure in which cylindrical media are arranged in a two-dimensional periodic pattern is explained; however, the structure is not limited to it. Therefore, the optical functional device 1 may have a three-dimensional structure in which such as spherical media are arranged in a three-dimensional pattern.

Figure 9:
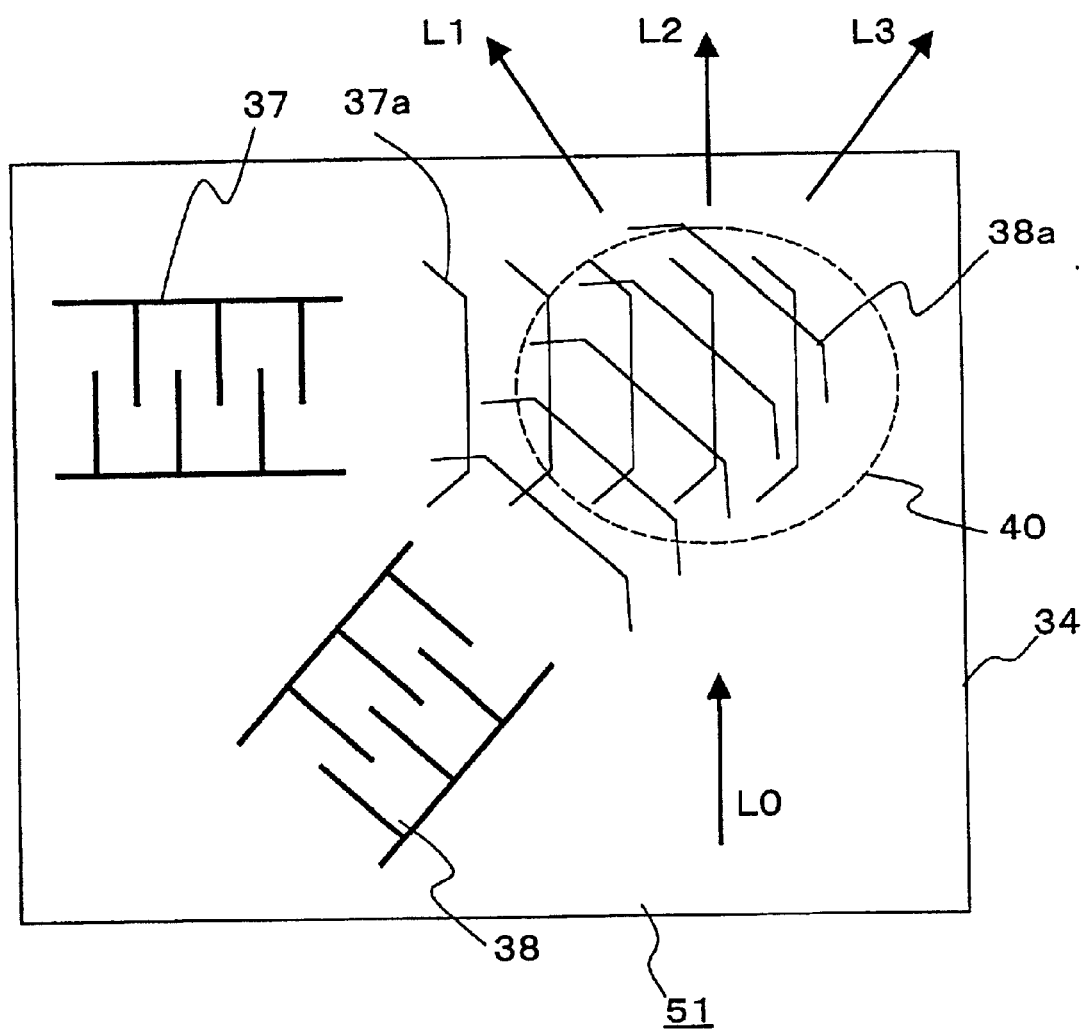
FIG. 9 is a plan view showing an optical integrated device of a fourth embodiment of the present invention.

FIG. 9 is a plan view showing an optical integrated device of a fourth embodiment of the present invention. The optical integrated device 51 has the construction in which a waveguide 34 is formed on a substrate (not shown), and on the surface of the waveguide 34, comblike-shaped electrodes 37, 38 are formed. The comblike-shaped electrodes 37, 38 are so designed that, by applying a voltage to them, forms surface acoustic waves 37a, 38a in the waveguides 34.

Figure 10A:
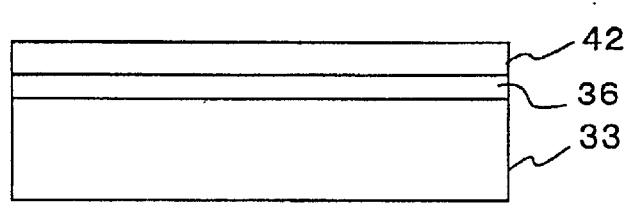
FIGS. 10A–10E are diagrams illustrating the manufacturing process of the optical integrated device of the fourth embodiment.

FIGS. 10A–10E are diagrams illustrating the manufacturing process of the optical integrated device 51. First, as shown in FIG. 10A, by thermally oxidizing a substrate 33 made of Si, a lower cladding layer 36 formed as a $SiO_2$ film is obtained on the surface of the substrate 33. The thickness of the lower cladding layer 36 is 0.8 $\mu$m. Then, a core layer 42 is so formed as to have a thickness of 0.8 $\mu$m by sputtering such as ZnO.

Figure 10B:
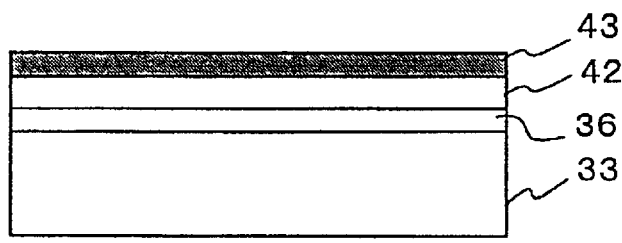
Figure 10C:
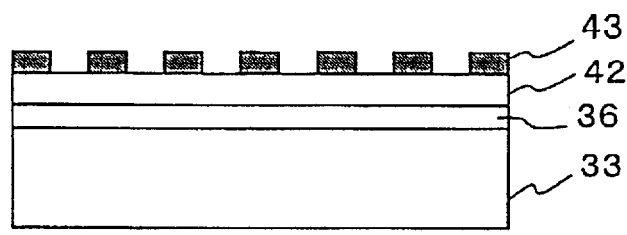
Figure 10D:
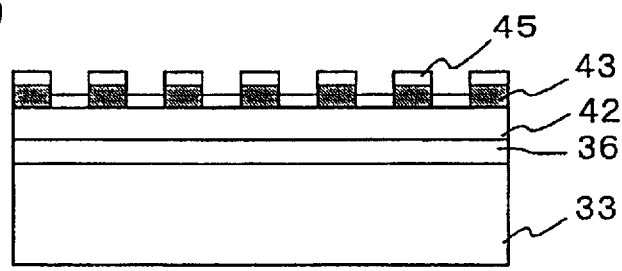
Figure 10E:
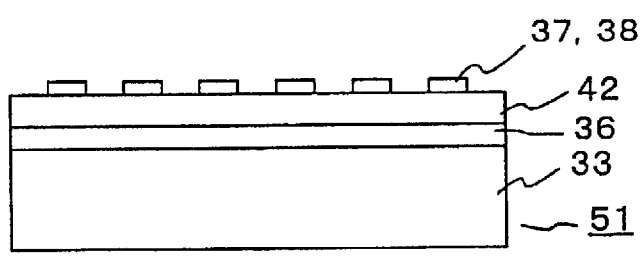

Then, as shown in FIG. 10B, a resist 43 is applied to the top surface of the core layer 42 by spin coating. And, as shown in FIG. 10C, the resist 43 is patterned into a desired shape by electron beam patterning. Next, as shown in FIG. 10D, an electrode material 45 (i.e. material to be formed as an electrode) such as Al is so deposited as to have a thickness of 0.1 $\mu$m by sputtering or the like. And by removing the resist 43, as shown in FIG. 10E, the optical integrated device 51 having the comblike-shaped electrodes 37, 38 that are attached to the core layer 42 is obtained.

The electrode material 45 is thin, and therefore it is possible to obtain the same result from the following process that the electrode material 45 is deposited on the core layer 42, and then the resist 43 is applied thereto, and then they are patterned into a desired shape. Thereafter, the optical integrated device 51 shown in FIG. 10E is obtained by etching the electrode material 45 by RIE (reactive-ion etching) or the like.

Figure 11A:
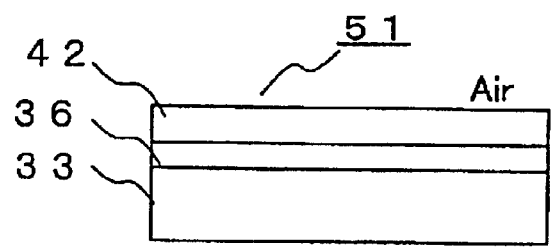
FIGS. 11A–11C are diagrams illustrating the refractive indices of the optical integrated device of the fourth embodiment.
Figure 11B:
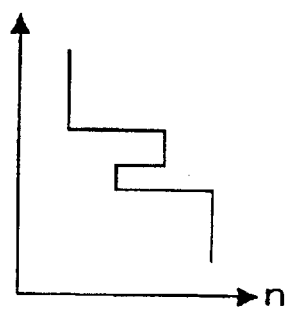
Figure 11C:
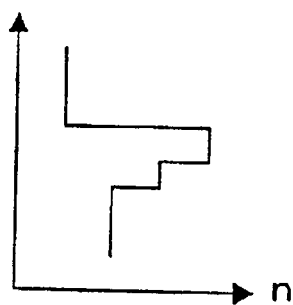

FIGS. 11A–11C show the refractive index distribution n of the optical integrated device 51 that varies in accordance with its thickness. FIG. 11A is a diagram showing the optical integrated device 51 in which comblike-shaped electrodes 37, 38 are left out from FIG. 10E. In FIGS. 11B and 11C, the axis of abscissa represents the refractive index n and the axis of ordinate represents the direction extending along to the thickness of the optical integrated device 51 (here, the axis of ordinate corresponds to the perpendicular direction in FIG. 11A). Note that, the same is true also with FIGS. 12A, 12B, 13A, 13B, 14A, 14B, and 14C, described latter.

As shown in FIG. 11B, the core layer 42 of the waveguide 34 lies between the air layer (indicated as Air in FIG. 11A) and the lower cladding layer 36 both of which have small refractive indices n, and therefore incident light is guided without being let out from the waveguide 34. As shown in FIG. 11B, the substrate 33 made of Si has a high refractive index n; however, as shown in FIG. 11C, it is also possible to use a substrate made of other material having a low refractive index n.

Figure 12A:
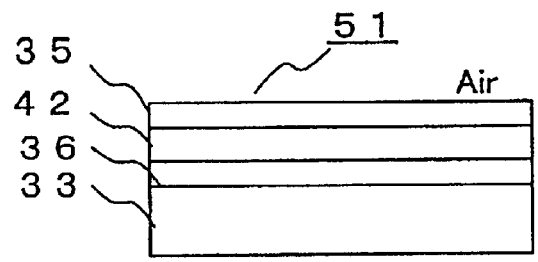
FIGS. 12A and 12B are diagrams illustrating the refractive indices of another optical integrated device of the fourth embodiment.
Figure 12B:
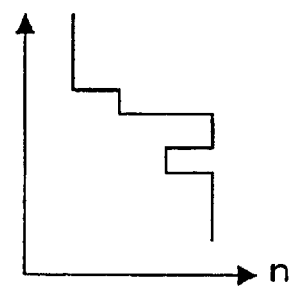

As shown in FIGS. 12A and 12B, it is also possible to provide an upper cladding layer 35 on the core layer 42. The upper cladding layer 35 can be obtained, for example, by applying a quartz substrate or by depositing $SiO_2$ or the like thereon. If the optical integrated device 51 is obtained by such a way as shown in FIG. 11A, the significant difference between the refractive index of the core layer 42 and that of the air layer causes loss of light amount because of light scattering. On the other hand, if the optical integrated device 51 is obtained by such a way as shown in FIG. 12A, the difference between the refractive index of the core layer 42 and that of the upper cladding layer 35 becomes smaller. Therefore, it helps reduce the loss of light amount caused by light scattering.

Figure 13A:
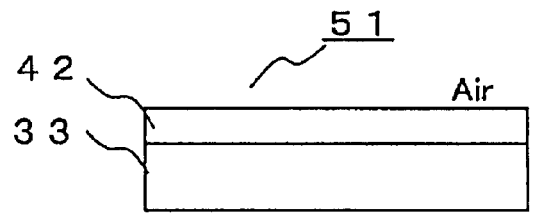
FIGS. 13A and 13B are diagrams illustrating the refractive indices of still another optical integrated device of the fourth embodiment.
Figure 13B:
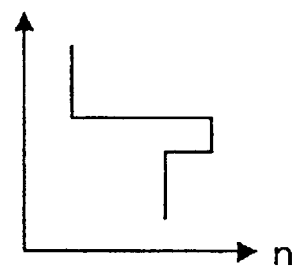
Figure 14A:
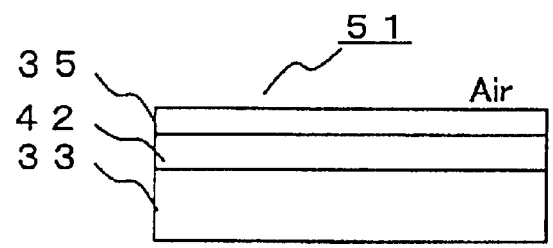
FIGS. 14A–14C are diagrams illustrating the refractive indices of still another optical integrated device of the fourth embodiment.
Figure 14B:
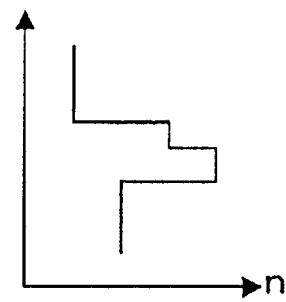
Figure 14C:
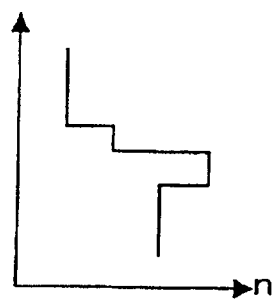

If, as the substrate 33, a substance such as quartz glass having a lower refractive index than that of the core layer 42 is used, as shown in FIGS. 13A and 13B, this eliminates the need for the lower cladding layer 36. Even in this case, as shown in FIGS. 14A–14C, it is also possible to form the upper cladding layer 35 in the same manner as mentioned above.

Figure 15A:
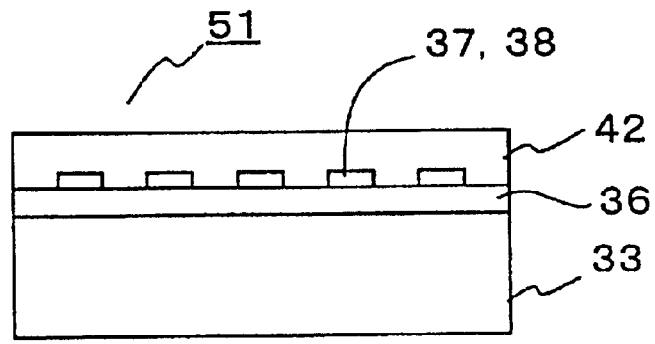
FIGS. 15A–15C are diagrams illustrating another construction of the optical integrated device of the fourth embodiment.
Figure 15B:
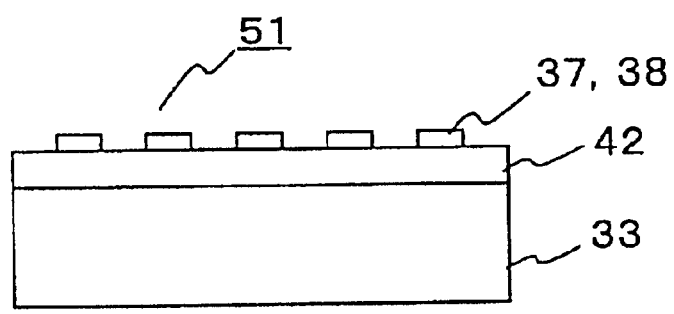
Figure 15C:
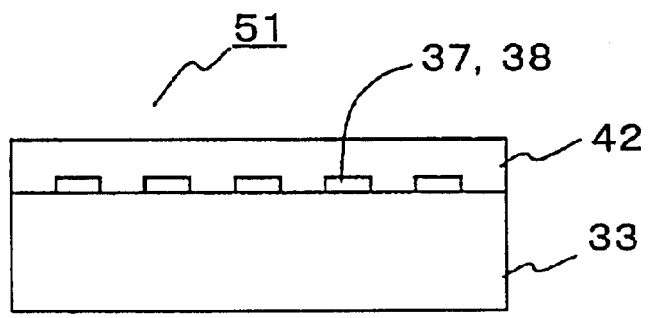

As shown in FIG. 10E previously described, on top of the waveguide 34, comblike-shaped electrodes 37, 38 are formed. Any other constructions than that shown in FIG. 10E may be introduced, as long as the comblike-shaped electrodes 37, 38 are attached to the core layer 42 of the waveguide 34 and they form surface acoustic waves 37a, 38a. Therefore, as shown in FIG. 15A, it is also possible to form the comblike-shaped electrodes 37, 38 on the layer right below the core layer 42. When the lower cladding layer 36 is not formed, the sectional view of the optical integrated device 51 having the comblike-shaped electrodes 37, 38 is as shown in FIGS. 15B or 15C.

In FIG. 9, as previously described, the core layer 42 (see FIG. 10A) forming the waveguide 34 is made of a piezoelectric material such as ZnO. Thereby, by applying a voltage to the comblike-shaped electrodes 37, 38, the surface acoustic waves 37a, 38a are efficiently propagated in the waveguide 34. As a result, in the waveguide 34, a refractive index distribution is formed with having a periodic pattern in the direction in which surface acoustic waves are propagated.

The periodicity of the refractive index distribution corresponds to that of the wavelengths of the surface acoustic waves 37a, 38a, and the portion exhibiting a higher refractive index together with the portion exhibiting a lower refractive index travel in the directions in which surface acoustic waves are propagated. Here, the surface acoustic waves 37a, 38a are propagated in the different directions, respectively. Therefore, in a periodic refractive indices portion 40 (i.e. a portion where the refractive index distribution exhibits a periodic pattern) where the travel paths of the surface acoustic waves 37a, 38a cross each other, the refractive indices are distributed in a two-dimensional periodic pattern on the surface that is parallel to the substrate 33.

Thus, a two-dimensional photonic structure is obtained. By installing a laser or a prism, the incident light L0 having been inputted in the waveguide 34 enters the periodic refractive indices portion 40, and then exits in the different directions according to the wavelengths of the light components, for example, the directions indicated as L1, L2, and L3.

If the frequency of the voltage applied to the comblike-shaped electrodes 37, 38 is changed, the wavelengths of the surface acoustic waves 37a, 38a are also changed, and therefore the periodic structure of the periodic refractive indices portion 40 is varied. Here, even if the incident light L0 has a single wavelength, in accordance with the variation of the wavelengths of the surface acoustic waves 37a, 38a, its exiting directions are varied, for example, in the directions indicated as L1, L2, and L3.

In other words, if the frequency of the voltage applied to the comblike-shaped electrodes 37, 38 is changed sequentially, the wavelengths of the surface acoustic waves 37a, 38a are also changed sequentially. As a result, it is possible to scan the light exiting from the periodical refractive indices portion 40. Here, the refraction occurring in the photonic structure exhibits a wide range of dispersion, and therefore it is possible to secure a wide scanning angle. As a result, by using the optical integrated device 51 employed in this embodiment, it is possible to cheaply obtain an optical scanning apparatus which can perform scanning at a high speed.

The optical integrated device 51 employed in this embodiment is varied its periodic structure, by varying the wavelengths of the surface acoustic waves 37a, 38a. Thereby, it is possible to make the incident light having different wavelengths or polarization directions exit in the identical direction, and to make the incident light having a single wavelength or polarization direction exit in the different directions.

Therefore, it is possible to employ the identical optical functional device in an optical apparatus which uses light having different wavelengths, polarization directions, or exiting directions. Therefore, it eliminates the need for manufacturing a plurality of optical functional devices having different media or different periodic patterns of media, and this helps reduce the cost of the optical functional device.

Figure 16:
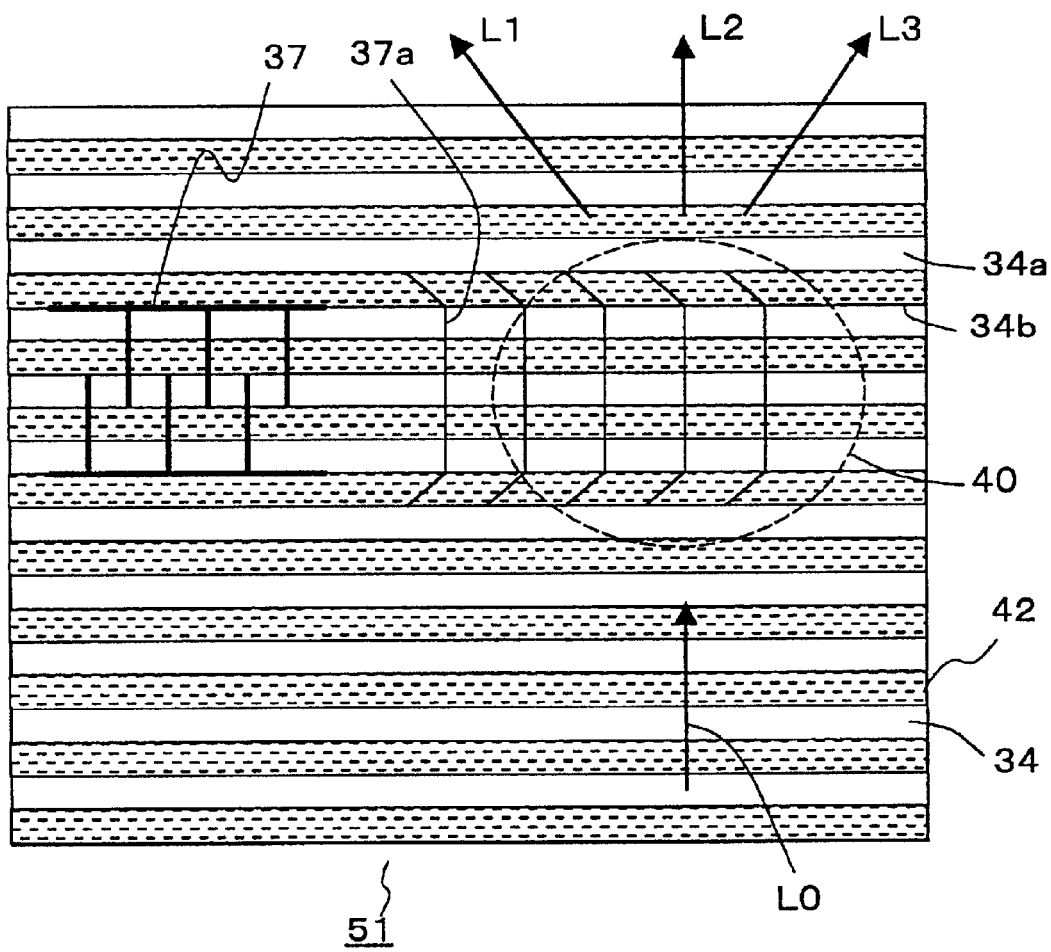
FIG. 16 is a plan view illustrating an optical integrated device of a fifth embodiment of the present invention.

FIG. 16 is a plan view illustrating an optical integrated device 51 of a fifth embodiment of the present invention. In this embodiment, such elements as serving the same or corresponding functions as in the fourth embodiment as shown in FIG. 9 previously described are identified with the same reference symbols. This embodiment is provided with the comblike-shaped electrodes 37, 38 identical to those in the fourth embodiment. In a waveguide 34, media 34a, 34b having the different refractive indices are arranged in one direction with a periodic pattern. In other respects, the construction here is the same as in the fourth embodiment.

Figure 17A:
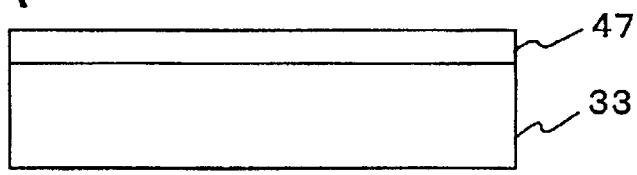
FIGS. 17A–17F are diagrams illustrating the manufacturing process of the optical integrand device of the fifth embodiment.
Figure 17B:
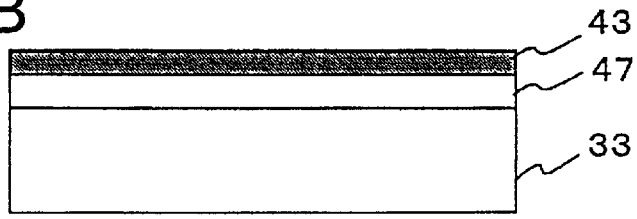
Figure 17C:
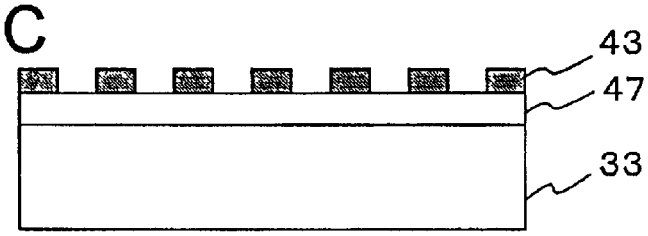

FIGS. 17A–17F show the manufacturing process of the optical integrated device 51 employed in this embodiment. As shown in FIG. 17A, on top of a substrate 33 made of LN, a diffusive material such as Ti is deposited by sputtering, and then is made to achieve thermal diffusion. Thus, a diffusive layer 47 is obtained. Then, as shown in FIG. 17B, a resist 43 is applied to the top surface of the diffusive layer 47 by spin coating. And then, as shown in FIG. 17C, by electron beam patterning, the resist 43 is patterned into a shape having a predetermined periodic pattern.

Figure 17D:
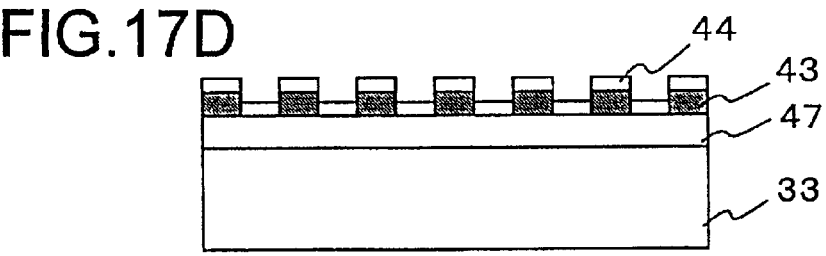
Figure 17E:
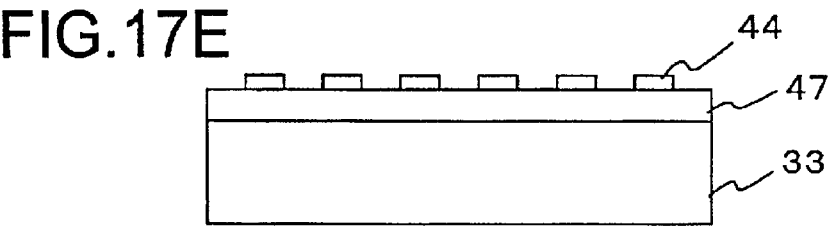
Figure 17F:
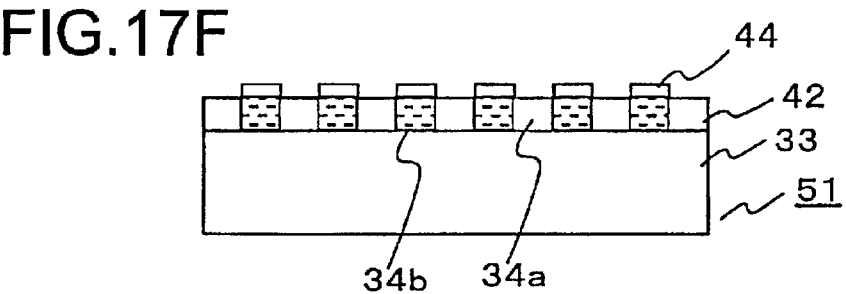

Thereafter, as shown in FIG. 17D, the diffusive material 44 is deposited thereon by sputtering or the like. And, as shown in FIG. 17E, when the resist 43 is removed, a pattern formed out of the diffusive material 44 such as Ti is obtained. And when the diffusive material 44 is made to achieve thermal diffusion, a core layer 42 composed of a medium 34b having a relatively large amount of Ti diffused therein and a medium 34a having a relatively small amount of Ti diffused therein is obtained.

Then, it is possible to obtain an optical integrated device 51 by forming a comblike-shaped electrode 37 in the same manner as in the fourth embodiment (see FIGS. 10C–10E). Here, as described previously, it is also possible to provide a lower cladding layer or an upper cladding layer, and the comblike-shaped electrode 37 may be arranged on the layer right below the core layer 42.

As shown in FIG. 16 previously described, by applying a voltage to the comblike-shaped electrode 37, surface acoustic waves 37a are propagated in the waveguide 34. As a result, in the waveguide 34, a refractive index distribution having a periodic pattern that corresponds to the periodicity of the wavelength of the surface acoustic waves 37a is obtained in the direction in which surface acoustic waves 37a are propagated. In the waveguide 34, media 34a, 34b are periodically arranged in the direction perpendicular to the direction in which the surface acoustic waves 37a are propagated. Therefore, in the travel paths of the surface acoustic waves 37a, on the surface parallel to the substrate 33, a periodic refractive indices portion 40 in which the refractive indices are distributed in a two-dimensional periodic pattern is formed.

Thus, a two-dimensional photonic structure is obtained, and as in the fourth embodiment, by consequentially varying the frequency of the voltage applied to the comblike-shaped electrode 37, the wavelength of the surface acoustic waves 37a is consequently changed accordingly. Therefore, the periodic pattern in the photonic structure is varied, and this makes it possible to scan the light exiting from the periodical refractive indices portion 40. Here, the refraction occurring in the photonic structure shows a wide range of dispersion, this makes it possible to secure a wide scanning angle. As a result, by using the optical integrated device 51 employed in this embodiment, it is possible to cheaply obtain an optical scanning apparatus which can perform scanning at a high speed.

In addition, by varying the wavelengths of the surface acoustic waves 37a, it is possible to make the incident light having different wavelengths or polarization directions exit in the identical direction, and to make the incident light having a single wavelength or polarization direction exit in the different directions. Therefore, it is possible to employ the identical optical functional device in an optical apparatus which uses light having different wavelengths, polarization directions, or exiting directions. Therefore, it eliminates the need for manufacturing a plurality of optical functional devices having different media or different periodic patterns of media, and this helps reduce the cost of the optical functional device.

The surface acoustic waves 37a propagate in the media 34a, 34b having different refractive indices, and therefore the speed of the surface acoustic waves 37a propagating in the media 34a and that of the surface acoustic waves 37a propagating in the media 34b are different, and thereby their wavelengths are different from each other. If the media 34a, 34b are so selected that the wavelength observed in one medium becomes a multiple of any integers of the wavelength observed in another medium, a periodic structure having a predetermined periodic pattern is obtained. And if the wavelength observed in one medium does not become a multiple of any integers of the wavelength observed in another medium, a more complex photonic structure is obtained in which the media 34a, 34b have the different periodic patterns of the refractive index distribution in the direction in which the surface acoustic waves 37a are propagated.

Figure 18:
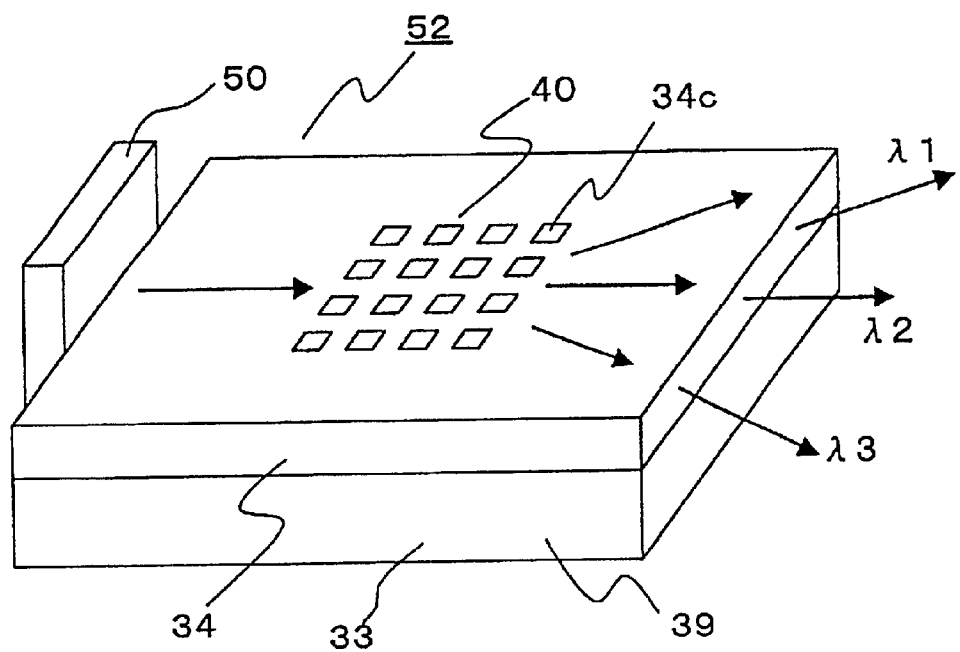
FIG. 18 is a perspective view showing an optical integrated device of a sixth embodiment of the present invention.

FIG. 18 is a perspective view showing an optical integrated device of a sixth embodiment of the present invention. In the following description, such elements as serving the same or corresponding functions as in the fourth and fifth embodiments previously described are identified with the same reference symbols. An optical integrated device 52 is obtained by attaching an illuminant device 50 to an optical functional device 39. In a waveguide 34 of the optical functional device 39, a periodic refractive indices portion 40 in which holes 34c are arranged in a two-dimensional periodic pattern is formed. The light emitted from the illuminant device 50 is directed to the periodic refractive indices portion 40 through the waveguide 34.

Figure 19A:
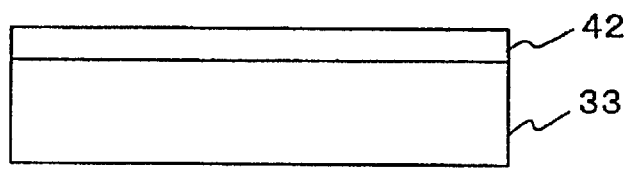
FIGS. 19A–19F are diagrams illustrating the manufacturing process of an optical functional device arranged in an optical integrated device of the sixth embodiment.
Figure 19B:
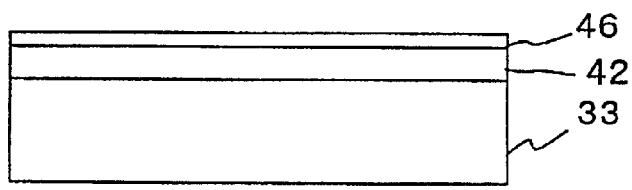
Figure 19C:
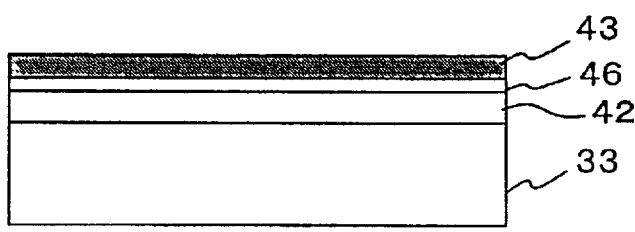

FIGS. 19A–19F are diagrams illustrating the manufacturing process of the optical functional device 39 employed in this embodiment. First, as shown in FIG. 19A, on the surface of a substrate 33 made of quartz glass, a core layer 42 made of $SiO_2$ having a higher refractive index than that of the substrate 33 is so formed as to have a thickness of 1 μm by a CVD method or the like. Then, as shown in FIG. 19B, on top of a core layer 42, a masking material 46 such as Si is so deposited as to have a thickness of 0.8 μm by sputtering. And then, as shown in FIG. 19C, to the top surface of the masking material, a resist 43 is applied by spin coating.

Figure 19D:
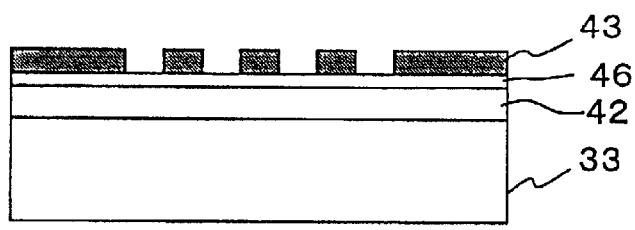
Figure 19E:
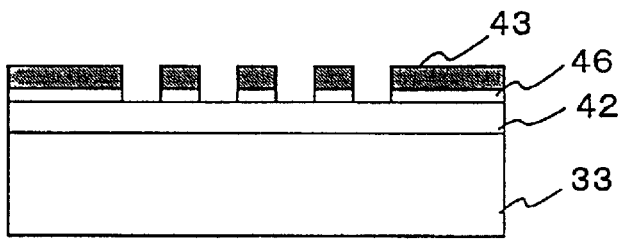
Figure 19F:
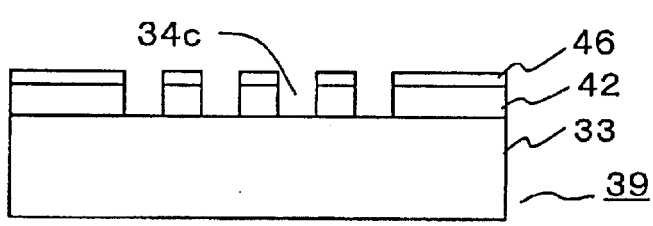

Then, as shown in FIG. 19D, by electron beam patterning, the resist 43 is patterned into a shape having a periodic pattern. And, as shown in FIG. 19E, by RIE or the like, etching is provided on the masking material 46. And then, the resist 43 is removed, and, as shown in FIG. 19F, by using the masking material 46 as a mask, the holes 34a are formed by etching the core layer 42 by RIE or the like. Thereafter, the masking material 46 is removed by wet-etching or the like, and the optical functional device 39 having the waveguide 34 as shown in FIG. 18 is obtained.

In this embodiment, as the core layer, $SiO_2$ is used; however, a piezoelectric material such as ZnO, $LiNbO_3$, or $LiTaO_3$ can be also used. It is also possible to form an upper cladding layer by applying quartz substrate or the like to the top surface of the core layer 42.

In the periodic refractive indices portion 40, air in the holes 34c and the medium in the core layer 42 (here, $SiO_2$) are arranged in a two-dimensional periodic pattern. Thus, a photonic crystal that has media having different refractive indices arranged in a periodic pattern is obtained.

In FIG. 18, when the illuminant device 50 is illuminated, the emitted light is guided through the waveguide 34 and enters the periodic refractive indices portion 40. The periodic refractive indices portion 40 is formed out of a photonic crystal, and therefore, for example, the light is refracted in the different directions according to the wavelengths λ1, λ2, or λ3, and then the light exits from the waveguide 34.

Here, the illuminant device 50 is so designed that emits light beam by sequentially varying the wavelengths at a regular interval. Therefore, the light exiting from the waveguide 34 is scanned by sequentially varying its exiting directions at a regular interval. Here, the refraction occurring in the photonic crystal exhibits a wide range of dispersion caused by the different wavelengths, and therefore by varying the wavelength of the light exiting from the illuminant device 50 around ±5 nm, as the optical integrated device 52 that performs scanning, it is possible to secure a wide scanning angle. As a result, it is possible to cheaply obtain an optical scanning apparatus which can perform scanning at a high speed.

In addition, by varying the wavelengths of the exiting light at a predetermined period, the illuminant device 50 makes it possible to emit light beam in a desired direction from the optical integrated device 52. Therefore, the optical integrated device 52 can be used also as a switching device.

Figure 20:
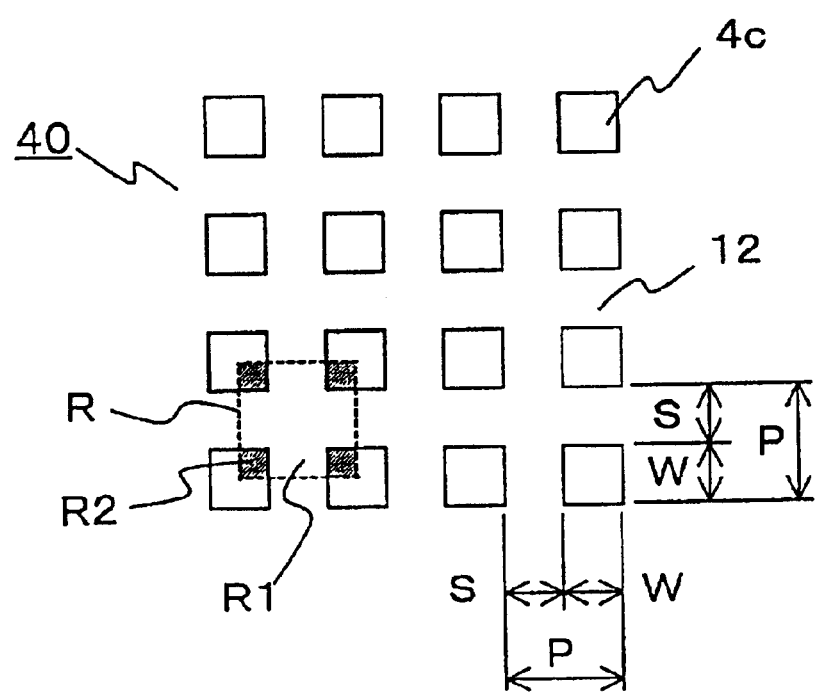
FIG. 20 is a detail view showing a periodic refractive index portion of the optical integrated device of the sixth embodiment.

The holes 34c are formed in a manner as shown in FIG. 20. The holes 34c are arranged in a tetragonal lattice, and the sectional view of the hole 34c shows a square having a side length of W. In a unit area R in which the holes 34c are periodically arranged, if the area ratio between the area R1 occupied by the core layer 42 and the area R2 occupied by the holes 34c is defined as f: 1−f, and the refractive indices of the core layer 42 and the holes 34c are defined as n1 and n2, respectively, the effective refractive index n0 of the periodic refractive indices portion 40 is given by $$n0 = n1f + n2(1-f)$$

Here, for obtaining a wide range of the refractive index distribution so as to correspond to the various wavelengths of the incident light, when the central wavelength is expressed as λ and the pitch of the holes 34 is expressed as P, following condition should be fulfilled:

$$P = m\lambda/(2 \cdot n0)$$

where m represents a natural number.

For example, if it is assumed that the material of the core layer 42 is $SiO_2$ (refraction index n1=1.467), the wavelength of the used light λ is 780 nm, and the refraction index of air n2 is 1, it is preferable that the following figures be fulfilled:

Pitch P=600 nm
Length of one side of the hole W=481 nm
Interval between the holes S (=P−W)=119 nm Here, regarding the direction in which light travels, it is possible to obtain a sufficient effect by forming around 10 periods (6 μm) of the holes 34c. And regarding the direction perpendicular to the direction in which light travels, with considering the distribution of the refractive indices, a satisfactory result can be obtained by forming the holes 34c along around 1 mm.

What is claimed is:

1. An optical functional device comprising:
    a periodic structure with a first refractive index portion and a plurality of second refractive index portions,
    wherein the second refractive index portions recur in a periodic pattern relative to the first refractive index portion, and
    wherein each recurrence of the second refractive index portion has a variable refractive index, and wherein, when the second refractive index portions are in a first refractive state, the optical functional device passes light having a first characteristic and blocks light having a second characteristic, and, when the second refractive index portions are in a second refractive state, the optical functional device passes light having the first characteristic and redirects light having the second characteristic.

2. An optical functional device as claimed in claim 1, wherein the second refractive index portions include a medium having an electro-optical effect, and by electrically controlling the medium from outside, it is possible to vary the periodic structure.

3. An optical functional device as claimed in claim 2, wherein the medium is liquid crystal.

4. An optical functional device as claimed in claim 1, wherein the refractive index of each recurrence of the second refractive index portion is varied by acoustic waves propagating in one or more media, and the refractive index of each recurrence of the second refractive index portion is controlled by electrically controlling the frequency of the acoustic waves from outside.

5. An optical functional device as claimed in claim 1, wherein the periodical structure is two-dimensional.

6. An optical integrated device comprising:
    a waveguide portion for guiding light; and
    a periodic structure portion to which light is directed by the waveguide portion, and which has a periodic structure with a first refractive index portion and a plurality of second refractive index portions,
    wherein the second refractive index portions recur in a periodic pattern relative to the first refractive index portion, and
    wherein each recurrence of the second refractive index portion has a variable refractive index, and wherein, when the second refractive index portions are in a first refractive state, the optical functional device passes light having a first characteristic and blocks light having a second characteristic, and, when the second refractive index portions are in a second refractive state, the optical functional device passes light having the first characteristic and redirects light having the second characteristic.

7. An optical integrated device as claimed in claim 6, further comprising:
    another waveguide portion for guiding light emitted from the periodic structure portion.

8. An optical integrated device as claimed in claim 6, further comprising:
    a voltage applying portion for applying a voltage to the periodic structure portion for varying the variable refractive index.

9. An optical integrated device comprising:
    a periodic structure portion which has a periodic structure with a first refractive index portion and a plurality of second refractive index portions,
    wherein the second refractive index portions recur in a periodic pattern relative to the first refractive index portion, and
    wherein each recurrence of the second refractive index portion has a variable refractive index, and wherein, when the second refractive index portions are in a first refractive state, the optical functional device passes light having a first characteristic and blocks light having a second characteristic, and, when the second refractive index portions are in a second refractive state, the optical functional device passes light having the first characteristic and redirects light having the second characteristic; and
    a waveguide portion for guiding light.

10. An optical integrated device as claimed in claim 9, further comprising:
    a voltage applying portion which applies a voltage to the periodic structure portion for varying the variable refractive index.

11. An optical integrated device comprising:
    a light source portion that can vary wavelengths of emitted light; and
    a periodic structure portion which has a periodic structure with a first refractive index portion and a plurality of second refractive index portions,
    wherein the second refractive index portions recur in a periodic pattern relative to the first refractive index portion, and
    wherein each recurrence of the second refractive index portion has a variable refractive index, and wherein, when the second refractive index portions are in a first refractive state, the optical functional device passes light having a first characteristic and blocks light having a second characteristic, and, when the second refractive index portions are in a second refractive state, the optical functional device passes light having the first characteristic and redirects light having the second characteristic.

12. An optical integrated device as claimed in claim 11, further comprising:
    a waveguide portion for directing light to the periodic structure portion.

13. An optical integrated device as claimed in claim 12, further comprising:
    a second waveguide portion for guiding light exiting from the periodic structure portion.

14. An optical integrated device as claimed in claim 13, further comprising:
    a third waveguide portion for guiding light exiting from the periodic structure portion.

15. An optical integrated device as claimed in claim 12, further comprising:
a voltage applying portion that applies a voltage to the periodic structure portion for varying the variable refractive index.

16. An optical functional device comprising:
a periodic structure having a first refractive index portion and a plurality of second refractive index portions, the second refractive index portions recurring in a periodic pattern with respect to the first refractive index portion; and
a controller for varying the refractive index of the plurality of second refractive index portions, and wherein, when the second refractive index portions are in a first refractive state, the optical functional device passes light having a first characteristic and blocks light having a second characteristic, and, when the second refractive index portions are in a second refractive state, the optical functional device passes light having the first characteristic and redirects light having the second characteristic.

17. An optical functional device as claimed in claim 16, wherein the plurality of second refractive index portions include a medium having an electro-optical effect, and wherein the controller electrically controls the medium to vary the refractive index of the plurality of second refractive index portions.

18. An optical functional device as claimed in claim 17, wherein the medium is liquid crystal.

19. An optical functional device as claimed in claim 16, wherein the controller varies the refractive index of the plurality of second refractive index portions by propagating waves in one or more media, and wherein the controller controls a frequency of the waves.

20. An optical functional device as claimed in claim 16, wherein the periodic structure is two-dimensional.

21. An optical functional device as claimed in claim 1 wherein the first characteristic is a first polarity state and the second characteristic is a second polarity state.

22. An optical functional device as claimed in claim 1 wherein the first characteristic is a first wavelength and the second characteristic is a second wavelength.

23. An optical integrated device as claimed in claim 6 wherein the first characteristic is a first polarity state and the second characteristic is a second polarity state.

24. An optical integrated device as claimed in claim 6 wherein the first characteristic is a first wavelength and the second characteristic is a second wavelength.

25. An optical integrated device as claimed in claim 9 wherein the first characteristic is a first polarity state and the second characteristic is a second polarity state.

26. An optical integrated device as claimed in claim 9 wherein the first characteristic is a first wavelength and the second characteristic is a second wavelength.

27. An optical integrated device as claimed in claim 11 wherein the first characteristic is a first polarity state and the second characteristic is a second polarity state.

28. An optical integrated device as claimed in claim 11 wherein the first characteristic is a first wavelength and the second characteristic is a second wavelength.

29. An optical functional device as claimed in claim 16 wherein the first characteristic is a first polarity state and the second characteristic is a second polarity state.

30. An optical functional device as claimed in claim 16 wherein the first characteristic is a first wavelength and the second characteristic is a second wavelength.

* * * * *